United States Patent [19]

Alten et al.

[11] Patent Number: 4,828,361
[45] Date of Patent: May 9, 1989

[54] SEMI-AUTOMATIC REAR VIEW MIRROR ASSEMBLY

[75] Inventors: Ralph W. Alten, Arnold; Alvin R. Fleming, St. Louis, both of Mo.

[73] Assignee: Siegel-Robert, Inc., St. Louis, Mo.

[21] Appl. No.: 89,744

[22] Filed: Aug. 26, 1987

[51] Int. Cl.[4] .............................................. G02B 17/00
[52] U.S. Cl. .................................... 350/279; 350/380; 350/381
[58] Field of Search ............... 350/279, 280, 281, 634, 350/636, 637, 276 R, 276 SL, 277

[56] References Cited

U.S. PATENT DOCUMENTS

| | | |
|---|---|---|
| 3,059,539 | 10/1962 | Meade . |
| 3,510,205 | 5/1970 | Schiffman et al. . |
| 3,582,732 | 6/1971 | Kovalsky . |
| 3,583,245 | 6/1971 | Schaefer . |
| 3,612,666 | 10/1971 | Rabinow . |
| 3,680,951 | 8/1972 | Jordan et al. . |
| 3,694,600 | 9/1972 | Koenig . |
| 3,696,684 | 10/1972 | Estlick . |
| 3,710,054 | 1/1973 | Koenig . |
| 3,722,371 | 3/1973 | Boyle . |
| 3,722,984 | 3/1973 | Brean . |
| 3,754,473 | 8/1973 | Massey . |
| 3,801,890 | 4/1974 | Ichiyanagi . |
| 3,942,086 | 3/1976 | Bresler . |
| 3,986,093 | 10/1976 | Wakamatsu et al. . |
| 4,107,588 | 8/1978 | Seiler . |
| 4,150,585 | 4/1979 | Manzoni . |
| 4,362,911 | 12/1982 | Sears et al. . |
| 4,443,057 | 4/1984 | Bauer et al. . |
| 4,448,488 | 5/1984 | Nakaho . |
| 4,463,296 | 7/1984 | Tada et al. . |
| 4,488,777 | 12/1984 | Bauer et al. . |
| 4,524,312 | 6/1985 | Matsumoto et al. . |
| 4,580,875 | 4/1986 | Bechtel et al. . |
| 4,665,650 | 5/1987 | Hall . |

FOREIGN PATENT DOCUMENTS 5090642 4/1977 Japan .

OTHER PUBLICATIONS

CMOS Cookbook by Don Lancaster, Copyright 1977 by Howard W. Sams and Co., Inc. (pp. 247, 248, 263).

Primary Examiner—Bruce Y. Arnold
Assistant Examiner—Martin Lerner
Attorney, Agent, or Firm—Rogers, Howell, Moore & Haferkamp

[57] ABSTRACT

The present invention includes a variable reflectivity mirror assembly to provide positions of high and low reflectivity which includes a support member or housing, a reflective panel, motor means, actuation means secured to the housing for driven by the drive element of the motor, and a timed-drive circuit for directing the current through the motor in opposite directions to move the mirror between the two positions. The present invention also includes a mechanism for actuating the mirror as well as the motor drive circuit and the push-button assembly for actuating the mirror.

39 Claims, 7 Drawing Sheets

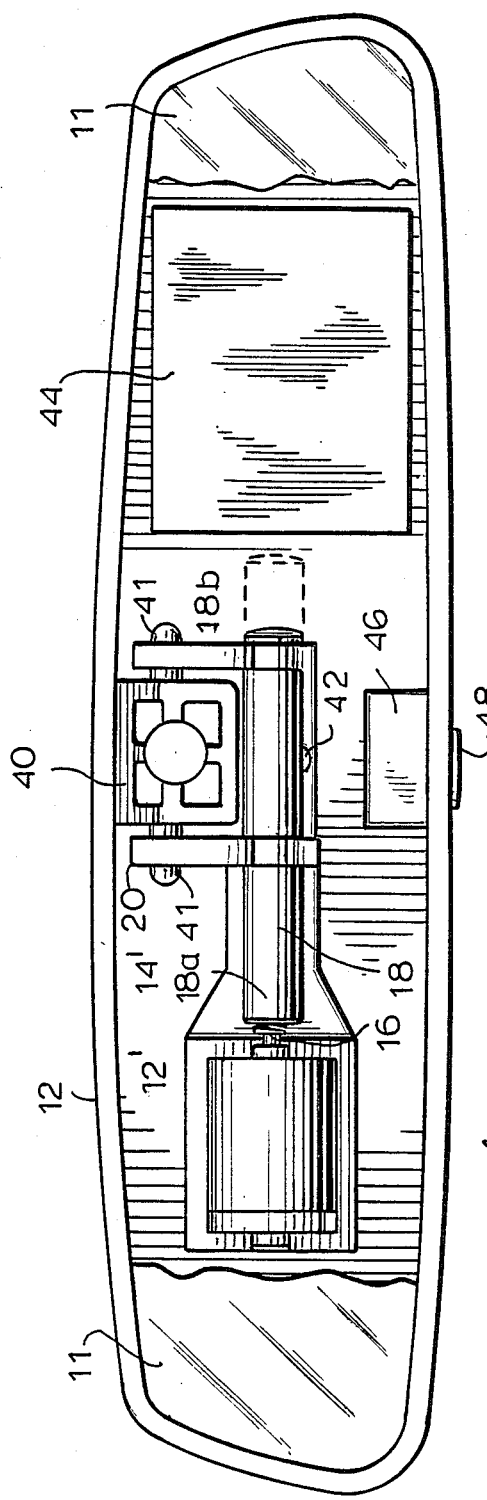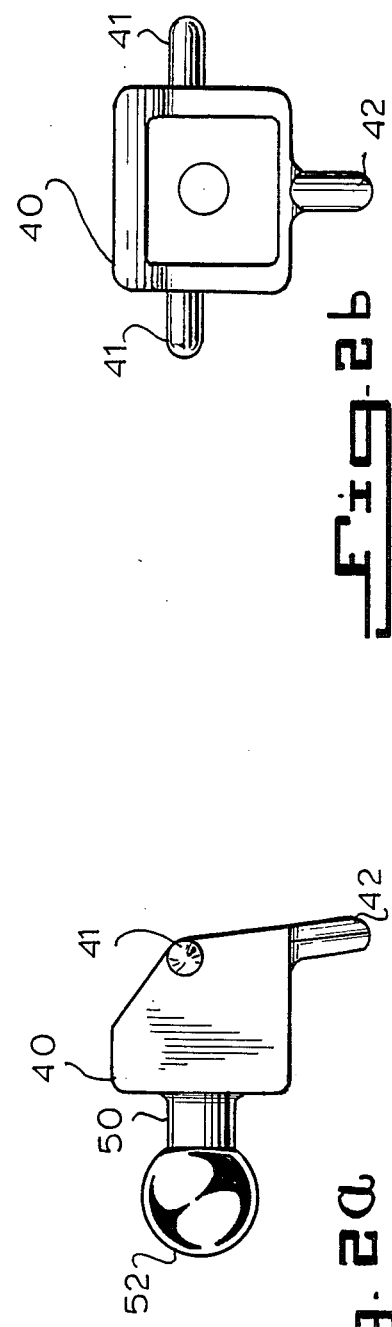

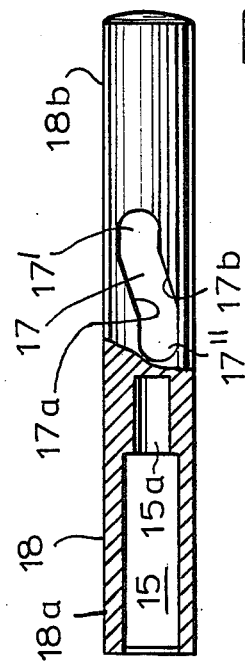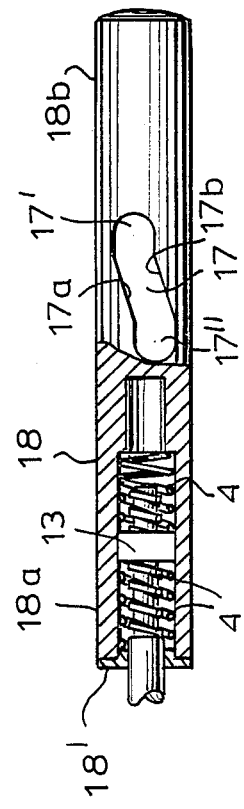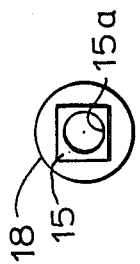

SEMI-AUTOMATIC REAR VIEW MIRROR ASSEMBLY

BACKGROUND OF THE INVENTION

The present invention relates to rear view mirror assemblies, such as those used in automobiles, and, in particular, to rear view mirror assemblies which provide high reflectivity position and low reflectivity position for night time conditions.

Many conventional rear view mirror assemblies employ prismatic mirrors which can be positioned by the vehicle operator in a high reflectivity or low reflectivity disposition. Such prismatic mirrors can be movably driven by a mechanical actuator mounted, for example, on the housing of the mirror assembly, or by an electronic circuit having a motor or solenoid driven actuator to manipulate the mirror or mirror/housing combination between the low and high reflectivity dispositions.

For example, U.S. Pat. No. 4,443,057, which issued to Bauer et al., discloses an automobile rear view mirror whose housing is moved by an eccentric cam driven by a uni-directional DC motor. As is disclosed in the above-identified Bauer et al. patent, the energization of the DC motor is controlled by limit switches, which switches sense when the mirror is in the low and high reflectivity dispositions. The limit switches cut off current to the DC motor. The use of limit switches is typical of many conventional automotive rear view mirror assemblies.

There are numerous inherent disadvantages associated with the use of limit switches. First, the housing of the rear view mirror provides limited space for carrying the electronic circuitry and mechanical structure associated with moving the mirror between the low and high reflectivity dispositions. A pair of limit switches usually require associated gearing, camming or other structure to actuate the switches, and such structure takes up an inordinate amount of space. Second, the mechanisms used for actuating and mounting the switches are relatively complex, making assembly and repair of the rear view mirror assembly difficult and time consuming.

Another disclosed mechanism in U.S. Pat. No. 3,680,951 to Jordan, et al. is a photoelectronically controlled rear view mirror which includes a first photocell to switch the mirror between "normal" and "adjusted" positions in response to incident light on the mirror, and a second photocell to monitor ambient light thereby preventing switching of the mirror to the "adjusted" position during daylight hours and at night where high ambient light conditions exist. Jordan, et al. utilize a pair of permanent magnets in combination with an electromagnet therebetween in which polarity can be alternated to drive a cam back and forth, which, in turn, moves a projection bearing thereagainst in order to adjust a mirror between positions of high and low reflectivity. The solenoid of Jordan, et al. must be continually energized to maintain the mirror in the desired orientation, and the cam/cam follower combination does not provide a smooth transition between the different reflectivity positions.

Other disclosures for mechanically changing the reflectivity orientation of rear view mirrors variously include electromagnetic means and pivotal base mounted mirrors, etc. However, it has become continuously clear that a smooth-operating two-position rear view mirror is required for automobiles in order to provide smooth and dependable switching for conditions of high and low ambient light.

Thus, it is an object of the present invention to provide a rear view mirror assembly which can be efficiently manufactured to provide smooth and dependable switching between positions of high and low reflectivity.

Another object of this invention is to provide a mechanical drive for smooth continuous movement of the mirror by use of a dependable bi-directional D.C. motor.

It is also an object of the present invention to provide an electronic control circuit for a motor driven, rear view mirror assembly.

It is another object of the present invention to provide a motor control circuit for a rear view mirror assembly which eliminates the need for limit switches.

It is a further object of the present invention to provide a control circuit for an automobile rear view mirror assembly, which control circuit is relatively simple and reliable and takes up relatively little space in the housing of the rear view mirror assembly.

It is yet another object of the present invention to provide a mirror control circuit for an automobile rear view mirror assembly which overcomes the inherent disadvantages of conventional rear view mirror assemblies.

It is further object of the present invention to provide a push-button switch, actuatable by the vehicle operator to change the reflectivity of the mirror, which switch is easy to manufacture and to assemble.

It is another object of the present invention to provide a push-button switch for a rear view mirror assembly which can be actuated with slight pressure.

It is a further object of the present invention to provide a push-button switch whose housing may be economically formed from identical molded half housing members.

It is yet another object of the present invention to provide a contact assembly for an electrical switch, which contact assembly is responsive to slight actuation pressure to provide an electrical path through the switch.

It is yet another object of the present invention to provide a contact assembly for an electrical switch which can be easily fabricated.

It is a still further object of the present invention to provide a push-button switch which has few components.

SUMMARY OF THE INVENTION

In accordance with the present invention a variable reflectivity mirror assembly is provided which is operable to provide high and low reflectivity orientations. The assembly includes a support member for securing the assembly to a structure which is immovable relative to the assembly, a housing mounted on the support member, a reflective panel connected to the support member for rotation between the high and low reflectivity orientations, such panel having a first side which provides the high reflectivity and a second side which provides low reflectivity. The assembly also includes motor means mounted in the housing which includes a drive element movable in opposite directions in response to oppositely directed currents applied to the motor, and actuation means secured to the housing for driving engagement with the drive element to rotate the reflective panel between the high and low reflectivity orientations. Finally, the present assembly also includes a timed-drive circuit means for directing current through the motor in one of the opposite directions in response to orientation selection means for a predetermined period of time sufficient to drive the actuation means to a selected orientation.

The motor is preferably a bi-directional rotary motor which has a drive shaft that is used with a worm gear to interconnect with a threaded gear means. In this embodiment an actuation means can include a gear means to engage the drive shaft and a transfer cam rod assembly coupled with the gear for linear movement responsive to the drive gear. The cam rod assembly can have at one end a cam surface against which a depending projection can bear against for providing oscillatory motion to a mirror while the cam moves linearly back and forth. The opposite end of the cam assembly rod can include a nut as a gear means which is fixed against rotation in a passageway provided in the cam rod. Preferably the nut is positioned in the passageway between two compression means such as compression springs so that when the worm gear is threaded through the nut linear travel is damped by action of the compression springs against the nut.

The present invention also includes a motor control circuit for an automobile rear view mirror assembly which provides current to a reversible DC motor of the assembly for a predetermined duration. The DC motor drives the reflective panel, e.g., a prismatic mirror, between a high reflectivity and low reflectivity orientation.

The motor control circuit basically comprises a momentary contact switch which is actuatable by the vehicle operator to alternately position the mirror in the high reflectivity or low reflectivity orientation. The switch is coupled to a toggle circuit, which circuit provides first and second logic output signals which are in alternate states and which change states in response to actuation of the switch.

First and second timing circuits are coupled to the toggle circuit. Each of the first and second timing circuits provides a pulsed output signal in response to the first and second outputs of the toggle circuit, respectively. The pulsed output signals of the timing circuits are of a predetermined duration, and effect the energization of the motor for substantially the predetermined duration of the pulsed output signals.

The motor control circuit also includes first and second motor drive circuits. The first and second motor drive circuits are coupled to the first and second timing circuits, respectively, and are responsive to the pulsed output signals of the timing circuits. The first and second drive circuits are coupled to the motor and selectively provide energizing current bi-directionally to the motor to effect motor movement alternately in a forward and a reverse direction for substantially the predetermined duration of the pulsed output signals of the first and second timing circuits.

In accordance with another aspect of the present invention, the momentary contact switch which the vehicle operator actuates to change the reflectivity state of the mirror is a push-button switch. The push-button switch includes a housing, an actuator and a contact assembly. The actuator is partially mounted in an opening formed in the housing. In a preferred form, the actuator includes a stem portion which is received by the housing opening and which includes two opposite ends, a tip portion which is mounted on one end of the stem portion and disposed in the interior of the housing to engage the contact assembly, and a head portion which is mounted on the other end of the stem portion and which is disposed outside of the housing.

The contact assembly is mounted in the housing. It includes first and second electrically conductive contact members, and first and second insulating members. Each of the first and second insulating members have at least one slot formed through its thickness. The first and second contact members are received by the slots formed in the first and second insulating members, respectively, and each contact member is disposed in an alternating underlying and overlying relationship with its respective insulating member.

The first contact member and first insulating member are disposed in an overlying relationship with the second contact member and second insulating member such that a portion of the first contact member faces a portion of the second contact member, and a portion of the first insulating member faces a portion of the second insulating member. The actuator is positionable in a first position, where it engages one of the first and second insulating members with sufficient pressure to cause the facing portions of the first and second contact members to engage one another to provide an electrically conductive path through the switch. The actuator is further positionable in a second position, where pressure on the insulating member by the actuator is sufficiently released to effect the non-engagement of the facing portions of the first and second contact members.

The housing is formed from substantially identical half housing members that are joined together by press fitting or the like. Each half housing member may be formed by injection molding techniques using a single mold. Each half housing member has a mating surface which engages the mating surface of the other, and includes a pin projecting outwardly from the mating surface and a hole formed in its mating surface. The pins of each housing member are received by the corresponding hole of the other housing member to join the two half housing members together.

The housing has a slot formed through its interior from one side to the other side. The slot is dimensioned to receive the contact assembly and to hold it in place in axial alignment with the actuator.

As a result of the present invention, a semi-automatic rear view mirror assembly can be provided which has high and low reflectivity orientations and which can be manufactured in a very efficient manner and which provides highly dependable and smooth operation to switch between the high and low reflectivity orientations. As a consequence of the unique motor control circuit, the bi-directional DC motor can be operated to smoothly move the reflective panel or mirror between the high and low reflectivity positions for a time period sufficient to drive the motor to allow attaining the high reflectivity and low reflectivity positions but limiting the time operation so that the motor is not activated a sufficient time beyond the attaining of such positions. As a result of this circuitry and mechanism, there is no need to provide limit switches which unnecessarily complicate the structure of the assembly.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 is a side elevational schematic of the assembly of a rear view mirror assembly constructed in accordance with the present invention;

FIG. 2a and 2b are side elevational and front elevational views respectively of a part of the support which holds the housing for pivotal movement;

FIG. 3 is a plan view in partial section of the actuation means between the motor drive element and the base portion shown in FIG. 2a and 2b;

FIG. 3a is an end view of the left hand side of the actuator means shown in FIG. 3 in whole;

FIG. 4 is a plan view in partial section similar to that shown in FIG. 3, but includes the actuator completely assembled with a drive gear inserted therein;

DETAILED DESCRIPTION OF THE INVENTION

THE ASSEMBLY

Figure 12:
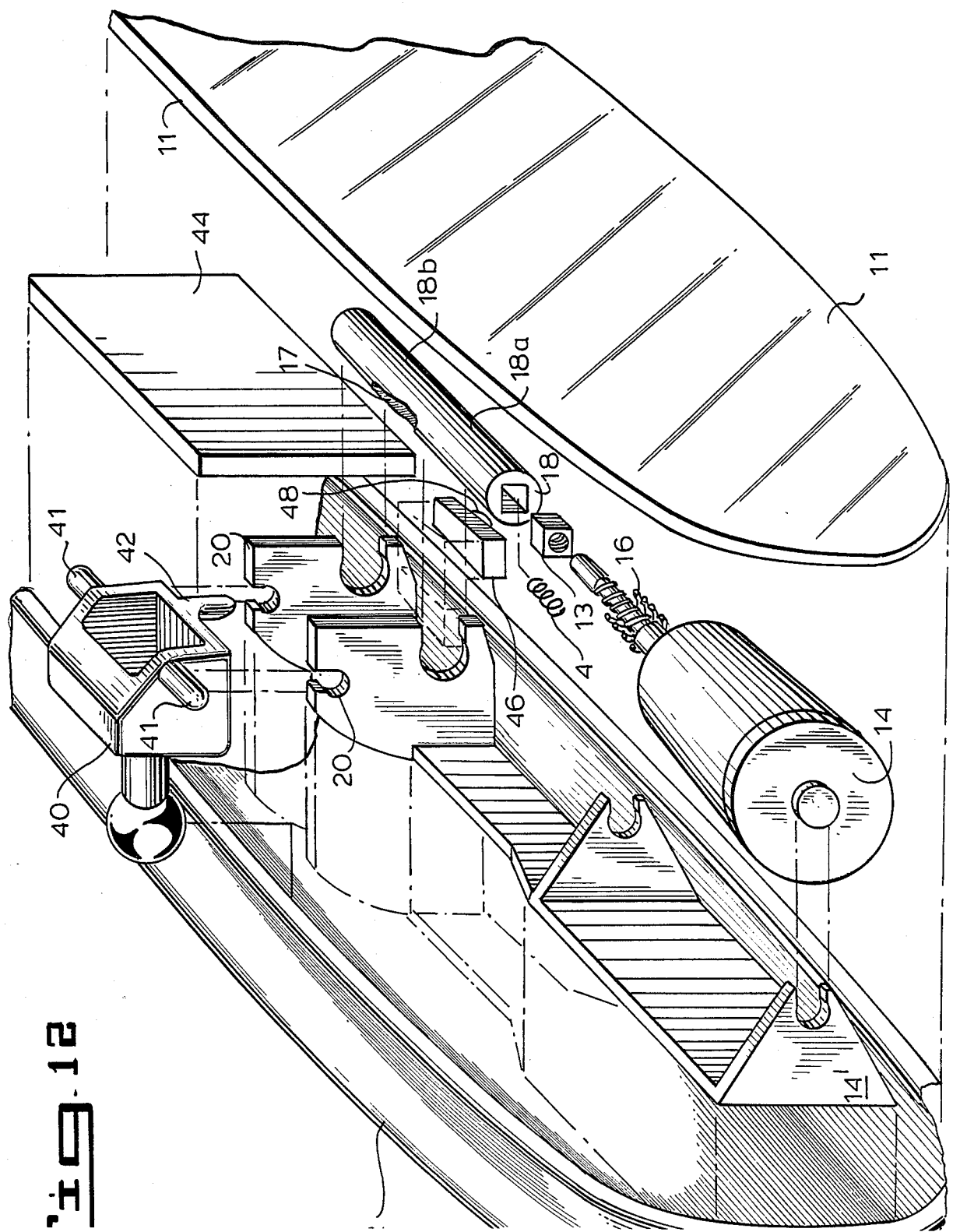
FIG. 12 is a partial exploded perspective view of the assembly in accordance with the present invention.

Referring to FIGS. 1 and 12, an assembly 10 as shown constructed in accordance with the invention can be seen therein. The assembly includes in general a housing 12 on which have been rigidly mounted by means of bracket 14′, a bi-directional DC motor 14 having a drive element shown therein as a worm gear 16. The worm gear 16 extends from the motor 14 to an actuator such as cam rod assembly 18 which is also rigidly fixed to the housing 12. The cam rod assembly 18, in turn, has a drive end 18a seen on the left hand side of the assembly and a camming end 18b shown on the right hand side of the assembly. When the cam rod assembly 18 is driven by the motor 14 through worm gear 16, the cam rod assembly is driven back and forth from right to left. The phantom lines shown extending from the right end of the cam rod assembly in FIG. 1 depict the farthest point of travel of the assembly.

The housing also has trunnions 20 spaced apart in the center of the housing for receipt of a support member 40 therein. In order to assemble the frame 12 onto the support it is necessary to insert, such as by snap fitting, arms 41 of the support member 40 into trunnions 20. The support member 40 also has a projection 42 extending from beneath the main body of the member 40 for receipt by the cam rod 18.

The assembly 10 also includes a circuit board 44 as well as an actuating switch S1 having a housing 46 and switch head portion 48 resembling an oversized button which can be easily operated to control the position of the rear view mirror by a passenger.

In the embodiment shown herein a mirror 11 having a trapezoidal cross section and consequently modes of high and low reflectivity is fixed to the frame 12 for simultaneous movement therewith. Furthermore, the cam rod assembly 18 is fixed to the back of housing 12 so that upon movement of the cam rod assembly, the housing is likewise moved therewith.

Referring now to FIGS. 2a and 2b, the interconnecting support member 40 is shown in greater detail. In FIG. 2a the support member 40 is shown having a stem 50 which extends to a ball 52 which is connected with, for example, a windshield support by means of a ball socket for mating relationship with the ball 52. Stem 50 and ball 52 extend from the back of the frame 12 so that the rear view mirror can be adjusted for individual passenger viewing. The housing is attached to the support member by means of side arms 41 which can be fitted into trunnions 20 which are fixed to the housing of the rear view mirror. Furthermore, projection 42 extends from beneath the body of the member 40 for insertion into a diagonal slot 17 in the cam rod assembly 18, which shall be explained in greater detail hereinbelow. In operation, the member 40 remains in place with the windshield support while the rear view mirror is caused to actuate by pivoting around the side arms 41. To this end, it has been found suitable to mount the side arms 41 in the trunnions 20 by virtue of a snap fit whereby relative rotation between the surface of the arms 41 and the trunnions 20 can be easily effected.

Referring now to FIG. 3, the cam rod assembly can be seen in greater detail, with the right hand portion of the assembly 18 having a diagonal slot 17 formed therein with end limits 17′ and 17″. On either side of the diagonal slot 17 there are surfaces 17a and 17b which bear against the projection 42 during operation of moving the mirror between high and low positions of reflectivity.

Referring to the left hand side of the assembly 18, a passage 15 can be seen formed therein in the partial section view. The passage 15 along with reduced passage area 15a has been provided to accommodate driving elements for the cam rod assembly and the motor 14. One convenient means of driving the cam rod assembly 18 is by use of a combination worm gear and drive nut which can be inserted in the passageway 15. Thus, the passageway 15 can have a generally square cross section as shown in the end view of FIG. 3a while the reduced portion of the passageway 15a can have a generally circular cross section for receipt of the worm gear after it passes through a drive nut.

The entire assembly as described above is shown in FIG. 4, wherein a drive nut 13 has been provided in passageway 15 along with compression springs 4 fixed on either side thereof to provide damped travel of the cam rod assembly back and forth. This damping effect provides smooth and easy travel of the mirror when being driven by the worm gear 16.

In operation the worm gear 16 can be driven by the DC motor in a clockwise direction to threadedly engage the drive nut 13 thereby pulling the drive nut to the left in FIG. 4. The drive nut 13 bears against compression spring 4 and thence against the end cap 18′ of the cam rod assembly 18. The cam rod 18 is driven to the left so that projection 42 is cammed alongside the slot sides 17a and 17b until it rests against slot end 17′. This pivots the frame 12 and the trapezoidal mirror 11 to the position of reflectivity associated therewith. The springs 11 help prevent the nut 13 from fitting too tightly against end cap 18' and against the other end of the passage 15, when the nut 13 is driven toward them after the desired orientation is reached.

When the worm gear 16 is rotated by bi-directional DC motor 14 in the counterclockwise direction, the nut 13 is threadedly engaged to be moved to the right hand side in FIG. 4 thereby bearing against compression spring 4 and thence to the shoulders of the passageway 15 of the cam rod assembly. In this mode of operation the assembly is thereby pushed to the right so that the projection 42 is cammed against sides 17a and 17b to drive the cam rod assembly and housing fixed thereto simultaneously to the position provided by the end 17" in slot 17.

It is important that in the present assembly, the motor control circuit provide current to actuate the worm gear 16 a sufficient time to move the rod assembly between the two limiting positions 17' and 17" of slot 17. The time controlled nature of the drive reduces the time period that the motor is activated to be just beyond that necessary to attain the desired orientation without excessive use of electricity. Furthermore, the present invention provides smooth and relatively uninterrupted travel between the two positions by virtue of the damping provided by compression springs 11 so that uneven travel resulting from surfaces sticking to one another can be prevented from being translated into jerky transition between positions of high and low reflectivity.

MOTOR CONTROL CIRCUIT

Figure 5:
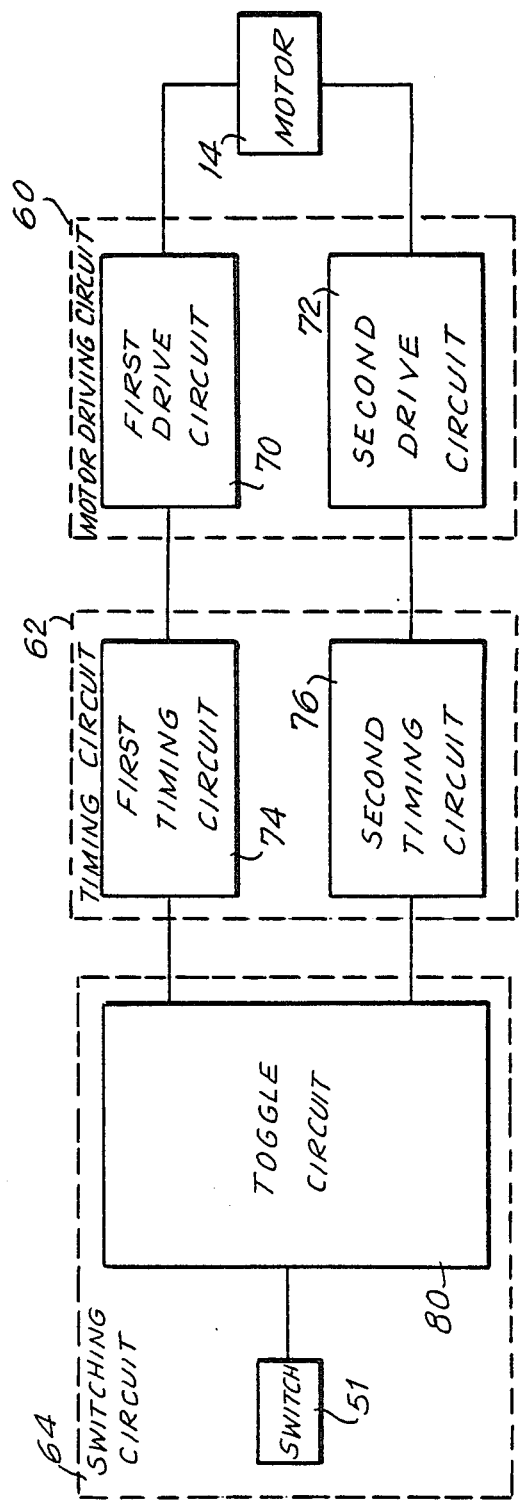
FIG. 5 is a block diagram of the motor control circuit of the present invention.

Referring to FIG. 5 of the drawings, it will be seen that the motor control circuit of the rear view mirror assembly constructed in accordance with the present invention includes, in its most basic form, a motor driving circuit 60, a timing circuit 62 and an operator actuatable switching circuit 64.

The motor driving circuit 60 is coupled to the reversible DC motor 14, which motor is operatively linked to the prismatic mirror 11 of the mirror assembly to drive the mirror between a low reflectivity disposition and a high reflectivity disposition. The motor driving circuit selectively supplies a current bi-directionally to the motor 14 to drive the motor.

The timing circuit 62 is used for controlling the time during which current is supplied to the motor 14. The timing circuit 62 provides an output signal, and the motor driving circuit 60 is responsive to the output signal of the timing circuit, and thus supplies current to the motor only for a predetermined duration determined by the timing circuit 62.

The switching circuit 64 of the motor control circuit is controllable by the vehicle operator. The switching circuit 64 is used for controlling the direction current is supplied to the motor 14. The switching circuit 64 provides an output signal, and the timing circuit 62 generates its output signal in response to the output signal of the switching circuit 64.

In a more preferred form of the motor control circuit of the present invention, the motor driving circuit 60 includes a first drive circuit 70 and a second drive circuit 72. Each of the first and second drive circuits 70, 72 are coupled to the motor 14. The first and second drive circuits 70, 72 are operable in a first state, where current is supplied to the motor 14 in a first direction so that the motor shaft rotates in a forward direction; in a second state, where current is supplied to the motor 14 in a second direction which is opposite to the first direction, so that the motor 14 rotates in a reverse direction; and in a third state, where no current is supplied to the motor 14 so that the motor does not turn and the mirror 11 remains in a particular disposition.

Similarly, in its preferred form, the timing circuit 62 of the motor control circuit includes a first timing circuit 74 and a second timing circuit 76. The first and second timing circuits 74, 76 are coupled to the first and second drive circuits 70, 72, respectively, and to the operator actuatable switching circuit 64. Each of the first and second timing circuits 74, 76 selectively provide a pulsed output signal of a predetermined duration in response to the output signal of the operator actuatable switching circuit 64. The first and second drive circuits 70, 72 are responsive to the pulsed output signals of the first and second timing circuits 74, 76, respectively, to supply or not supply current to the motor 14.

The operator actuatable switching circuit 64 preferably includes a switch S1, disposed on the outside of the mirror assembly housing 12 for the vehicle operator to actuate, and a toggle circuit 80 coupled to the switch S1. The switch S1 is a momentary contact switch, and the toggle circuit 80 provides a logic output which changes logic states in response to actuation of the momentary contact switch.

Figure 6:
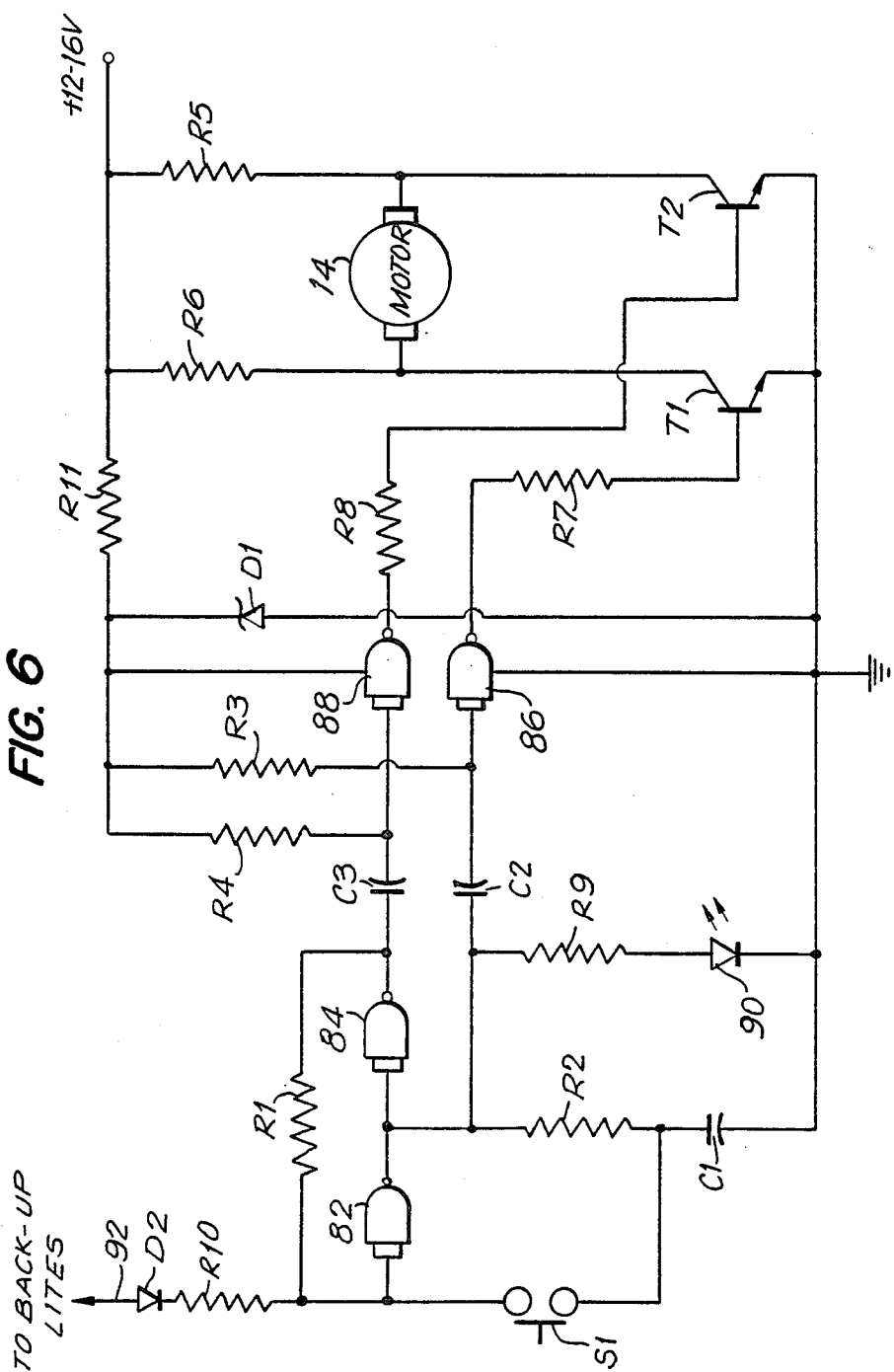
FIG. 6 is a schematic diagram of the motor control circuit illustrated by FIG. 5.

Referring now to FIG. 6 of the drawings which schematically illustrates a preferred form of the motor control circuit, it will be seen that the momentary contact switch S1 is basically a push-button switch, and the toggle circuit 80 includes first and second NAND gates 82, 84, each of which has its inputs connected together so that each gate acts as an inverter. The output of the first gate 82 is coupled to the input of the second gate 84, and the output of the second gate 84 is coupled back to the input of the first gate 82 through a feedback resistor R1. Furthermore, the output of the first gate 82 is connected to a storage device, such as a capacitor C1, through a resistor R2, and the capacitor C1 is selectively coupled to the input of the first gate 82 through the push-button switch S1.

As its name implies, the toggle circuit 80 provides alternate logic states at the outputs of the first and second gates 82, 84, which outputs change state every time the push-button switch S1 is actuated.

If, for example, the outputs of the first and second gates 82, 84 are respectively at a high and low logic level, the capacitor C1 will charge through the resistor R2 to a voltage comparable to a high logic level. When the push-button switch S1 is actuated, the charge on the capacitor C1 is transferred through the switch to the input of the first gate 82, causing the first gate to change states (in the example, the output of the first gate 82 goes to a low logic level). Because the two gates are coupled together, the first gate 82 causes the output of the second gate 84 to change states (that is, to a high logic level). The high logic level of the second gate's output is fed back to the input of the first gate 82 through the resistor R1, which logic level is the same as the logic level initially impressed on the first gate 82 by the capacitor C1.

The capacitor C1 will now discharge to a low logic level, which logic level will be impressed on the input of the first gate 82, causing the output of the first and second gates 82, 84 to change states, when the push-button switch S1 is actuated a second time.

Thus, the switching circuit 64 acts as a low speed debouncing circuit which provides logic output signals that are in alternate states and that change states every time the push-button switch S1 is actuated.

As mentioned previously, the first and second timing circuits 74, 76 are connected to the toggle circuit 80 and, more specifically, to the outputs of the first and second logic gates 82, 84, respectively. Each of the first and second timing circuits 74, 76 preferably includes a timing capacitor C2, C3 and a timing resistor R3, R4, which are connected together, and a logic NAND gate whose inputs are connected together so that each NAND gate acts as an inverter. The inputs of the NAND gates 86, 88 are connected to their respective timing resistors R3, R4 and capacitor C2, C3. The timing capacitors C2, C3 are connected to the outputs of the first and second gates 82, 84 of the toggle circuit 80.

The capacitors C2, C3 of the timing circuits 74, 76 will charge through their respective timing resistors R3, R4 to either a high logic level or a low logic level, depending upon the state of the first and second gates 82, 84 of the toggle circuit. If, for example, the outputs of the first and second gates 82, 84 are respectively high and low, the timing capacitors C2, C3 of the first and second timing circuits 74, 76 will charge to a low and high logic level, respectively. However, under steady state conditions, the inputs of the NAND gates 86, 88 of the first and second timing circuits will be pulled up to a high logic level through their respective timing resistors R3, R4 so that the outputs of the NAND gates 86, 88 will be at a low logic level.

When the toggle circuit 80 changes states, the inputs of the NAND gates 86, 88 of the timing circuits 74, 76 will see the pre-existing charge on the timing capacitors C2, C3 coupled with the new logic level of the first and second gates 82, 84. Thus, in the example given above, the input of the first timing circuit's gate 86 will see the low logic level charge of the timing capacitor C2 in combination with the low output state of the first gate 82 of the toggle circuit 80 and, accordingly, the output of the gate 86 will change from a low logic level to a high logic level.

In an analogous fashion, the gate 88 of the second timing circuit 76 will see the high logic level charge on the capacitor C3 coupled with the new high logic level on the output of the second gate 84. Because the input of the NAND gate 88 was already at a high logic level (under steady state conditions), its output will remain at a low logic level.

The timing capacitors C2, C3 will now charge to new logic levels. The timing capacitor C2 of the first timing circuit 74 will charge to a high logic level, and the timing capacitor C3 of the second timing circuit 76 will discharge to a low logic level. When the timing capacitor C2 of the first timing circuit 74 has charged sufficiently, the input of the NAND gate 86 will be pulled up to a high logic level, causing its output to go low. The output of the NAND gate 88 of the second timing circuit 76 will remain low, a its input remains at a high logic level.

Thus, in the example given above, a pulsed output signal is provided on the output of the NAND gate 86 of the first timing circuit 74. The NAND gate's output provides a high going pulse having a pulse width which is proportional to the product of the resistance of the timing resistor R3 and the capacitance of the timing capacitor C2.

When the push-button switch S1 is actuated a second time, causing the outputs of the toggle circuit 80 to alternate in state, the output of the NAND gate 88 of the second timing circuit 76 will now provide a high going pulsed signal whose pulse width is determined by the resistance and capacitance of the corresponding timing resistor R4 and capacitor C3, while the output of the NAND gate 86 of the first timing circuit 74 will remain low. As will be seen, the DC motor 14 of the motor control circuit will only be driven substantially for the duration of the high going pulse on the output signals of the NAND gates of the first and second timing circuits 74, 76.

As mentioned previously, the motor driving circuit includes first and second drive circuits 70, 72 which are coupled to the motor 14. As will be seen, the first and second drive circuits 70, 72 respectively operate as a source of and a sink for current supplied to the motor 14 when the circuits are in one state, and respectively operate as a sink for and a source of current when the circuits are in a second state.

Each of the drive circuits 72, 74 includes a transistor T1, T2, which acts as a switch, coupled to the motor 14; a load resistor R5, R6 which is coupled to the transistor T1, T2 and to the motor 14; and a base resistor R7, R8 which is coupled to the base of the transistor T1, T2. The base resistors R7, R8 of the first and second drive circuits 70, 72 are connected to the outputs of the NAND gates 86, 88 of the first and second timing circuits, respectively.

The transistors T1, T2 of the first and second drive circuits 70, 72 are driven on and off in response to the pulsed output signals of their respective timing circuits 74, 76 to which they are connected so that they either conduct current through the motor 14 or do not conduct current.

Under steady conditions, when the outputs of the NAND gates 86, 88 of the first and second timing circuits 74, 76 are at a low logic level, the transistors T1, T2 of the first and second drive circuits 70, 72 will be cut off so that they do not conduct current. In this state, neither transistor T1, T2 acts as a sink for motor current, and as a result, the motor 14 does not rotate.

If, for example, actuation of the push-button switch S1 causes a high going pulse at the output of the first timing circuit's NAND gate 86, the high going pulse is provided to the base of the transistor T1 of the first drive circuit through the base resistor R7. The transistor T1 will be turned on and will conduct current through the motor supplied by the load resistor R5. The logic output of the second timing circuit 76 remains low during the presence of the high going pulse on the first timing circuit's output; as a result, the transistor T2 of the second drive circuit 72 remains cut off so that it does not conduct current through the motor 14. Consequently, current flows through the motor in one direction so that the motor 14 will rotate in the forward direction.

The transistor T1 of the first drive circuit 70 will remain on only for the duration of the high going pulse on the first timing circuit's output. When the output of the first timing circuit 74 returns to a low, steady state level, the transistor T1 will be cut off and stop conducting current through the motor 14. The motor will, of course, stop rotating in the forward direction when no current flows through it.

If the push-button switch S1 is actuated a second time, a high going pulse is now provided by the second timing circuit 76 through the base resistor R8 to the transistor T2 of the second drive circuit 72. The transistor T2 will conduct current through the motor 14 supplied by load resistor R6, while during this time the transistor T1 of the first drive circuit 70 will remain non-conductive. Accordingly, current is now supplied through the motor 14 in an opposite direction, causing the motor to rotate in a reverse direction.

The transistor T2 of the second drive circuit 72 will conduct for the duration of the high going pulse of the second timing circuit 76. Both transistors T1, T2 of the first and second drive circuits are cut off and will not conduct current through the motor 14 when the outputs of the first and second timing circuits 74, 76 return to their low, steady state logic level.

Thus, it can be seen that every time the push-button switch S1 is actuated by the vehicle operator, the motor 14 controlling the disposition of the mirror 11 will be driven in either the forward direction or the reverse direction for a time determined by the values of the resistors R3, R4 and capacitors C2, C3 of the first and second timing circuits 74, 76. The values of these components are selected to ensure that the motor 14 is driven sufficiently in each direction so that the mirror 11 is placed in either a low reflectivity disposition or a high reflectivity disposition. Thus, the motor control circuit of the present invention eliminates the need for limit switches employed in conventional rear view mirror assemblies to control the current through the mirror positioning motor.

The motor control circuit may further include an indicator 90 which is mounted on the mirror housing 12 and which is visible to the vehicle operator to indicate when the mirror is in the low reflectivity mode. Preferably, the indicator 90 is a light emitting diode which is coupled through a current limiting resistor R9 to the output of the first gate 82 of the toggle circuit 80. Thus, whenever the output of the first gate 82 goes to a high logic level, the light emitting diode 90 will conduct to indicate that the mirror 11 is in the low reflectivity disposition.

It is also desirable for the mirror control circuit to automatically switch the mirror 11 to a high reflectivity disposition whenever the automobile is backing up. For this purpose, the input of the first gate 82 of the toggle circuit 80 is connected to the vehicle's hot lead 92 of the backup lights through a resistor R10 and a diode D2, connected in series with resistor RIO. When the vehicle operator puts the automobile transmission into reverse, the hot lead 92 to the backup lights will be energized, impressing a high logic level on the input of the first gate 82. If the mirror 11 is not already in the high reflectivity disposition, the mirror control circuit will energize the motor 14 to drive the mirror to that particular disposition.

One of the further advantages of the particular configuration of the motor drive circuit is that it helps brake the rotation of the motor shaft after the motor has been energized for the time determined by the timing circuit. This prevents the motor 14 from "coasting" after it has already placed the mirror 11 into either reflectivity disposition. The "braking" effect is caused by the connection of the load resistors R5, R6 to the motor 14. After the transistors T1, T2 of the first and second drive circuits 70, 72 become nonconductive, the motor 14 continues to turn slightly. The motor thus becomes a generator and provides a reverse voltage across the load resistors R5, R6. This reverse voltage causes reverse current to flow through the motor 14, stopping it in a relatively short period of time.

The motor control circuit further includes a power control circuit comprising a zener diode D1 coupled to a resistor R11. The zener diode D1 helps protect the circuit from surges in the line voltage, or from connecting the motor control circuit inadvertently to a voltage source of incorrect polarity.

The motor control circuit of the present invention provides a bi-directional current to the DC motor 14 which drives the mirror 11 between low reflectivity and high reflectivity dispositions. The motor is driven in the forward or reverse directions for substantially the time determined by the values of the resistors R3, R4 and capacitors C2, C3 of the first and second timing circuits.

The motor control circuit of the present invention eliminates the need for limit switches found in conventional rear view mirror assemblies. The circuit has relatively few components, which increases its reliability and enhances its ability to be easily fitted into the housing of the rear view mirror assembly.

THE SWITCH

Figure 7:
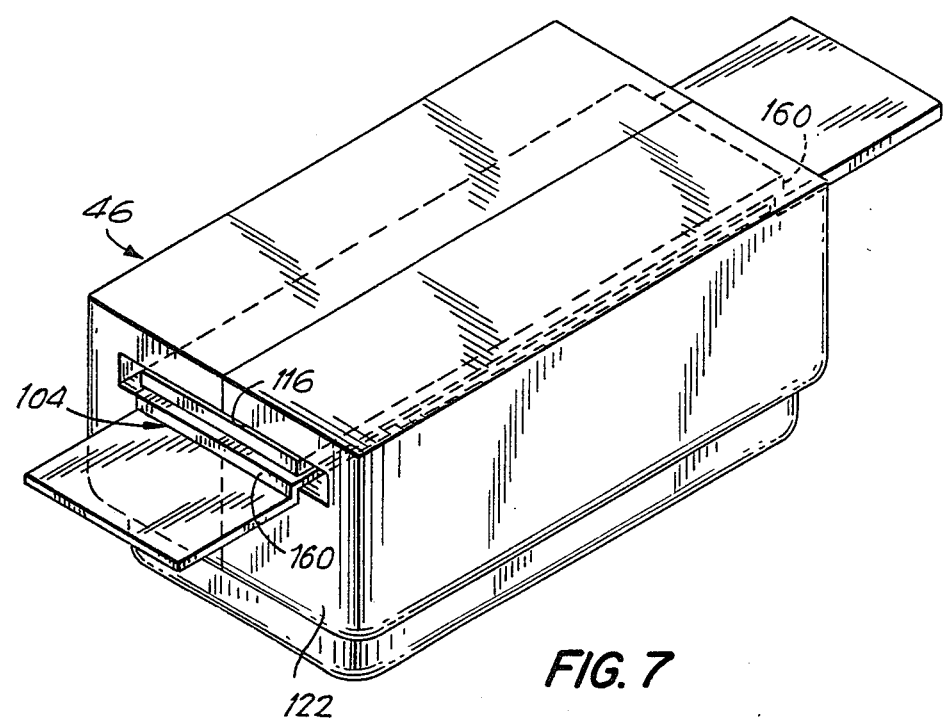
FIG. 7 is an isometric view of a push-button switch, which is actuated by the vehicle operator to change the reflectivity of the mirror, formed in accordance with the present invention.
Figure 8:
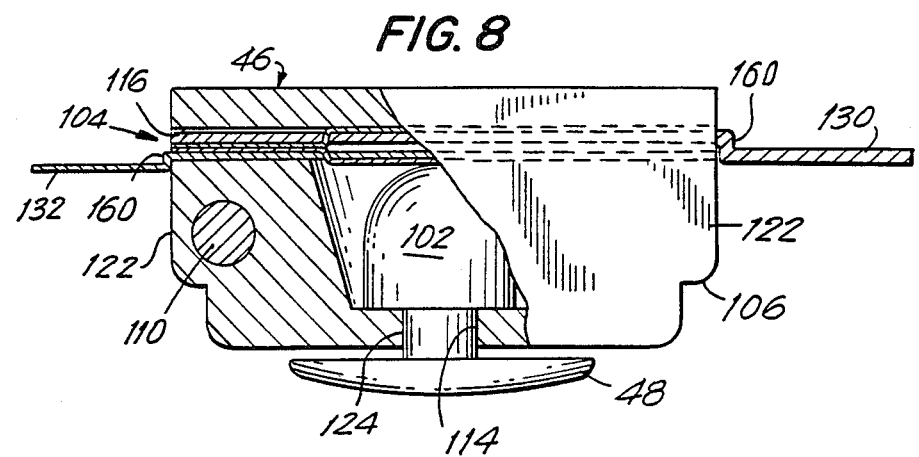
FIG. 8 is a side view of the push-button switch with its housing partially broken away.
Figure 9:
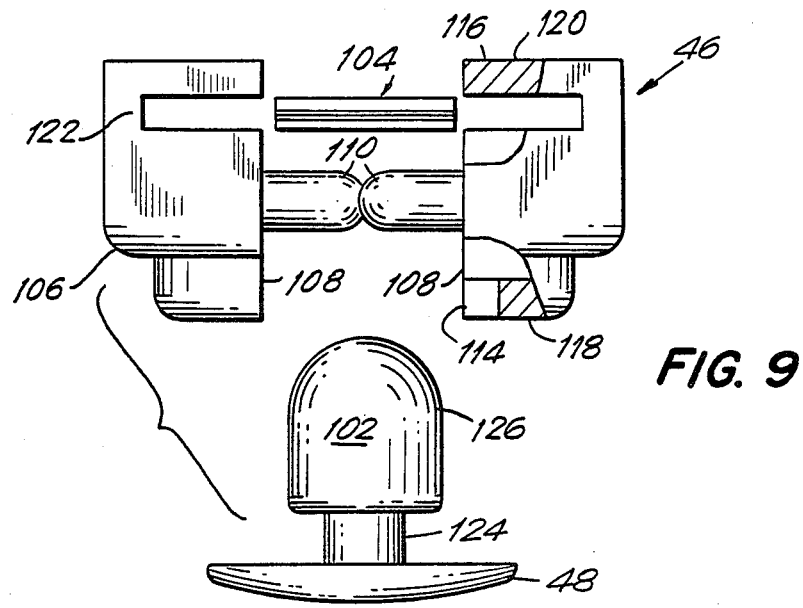
FIG. 9 is an exploded view of the push-button switch shown in FIGS. 7 and 8.

Referring initially to FIGS. 7-9 of the drawings, it will be seen that the push-button switch S1 constructed in accordance with the present invention basically includes a housing 46, an actuator 102, and a contact assembly 104.

The housing 46 is preferably formed by injection molding although other techniques may be used. Advantageously, the housing is formed from two substantially identical half housing members 106 which are joined together by press fitting or the like. Thus, only one mold is needed in the injection molding process of forming the half housing members 106.

Each half housing member 106 has a mating surface 108 which engages the mating surface of the other when the two are joined together. A pin 110 extends outwardly of the mating surface 108 of each half housing member, and a hole 112 is also formed in each mating surface 108. The pin 110 of each half housing member is received by the hole 112 formed in the other half housing member so that the two can be press fitted together to define the housing 100 of the push-button switch S1. The pin and hole arrangement allows the half housing members 106 to be joined together without gluing or other fasteners, although such may be used if desired.

An opening 114 and a slot 116 are formed in the housing to receive the actuator 102 and the contact assembly 104, respectively. The opening 114 is formed in the bottom side 118 of the housing, and the slot 116 is formed near the top side 120 of the housing and extends through the housing's opposite lateral sides 122 The slot 116 overlies the opening 114 so that the contact assembly 104 will be in axial alignment with the actuator 102 when the two are assembled in the housing.

Preferably, as shown in FIG. 9, each half housing member 106 is formed with half the slot 116 and half the opening 114 so that when the housing members are joined, together they define the full slot and full opening of the housing. As will be seen, forming each housing member 106 with slot and opening portions will facilitate assembly of the push-button switch S1.

The actuator 102 is the component of the push-button switch which the vehicle operator presses to effect an electrical path through the switch. The actuator 102 includes a cylindrical stem portion 124 which is received by the housing opening 114 and which includes two opposite ends. On one end of the stem portion 124 is mounted a tip portion 126 which is disposed in the interior of the housing 100 when the switch is assembled. The tip portion 126 is a rather bulbous formation which is adapted to engage the contact assembly 104.

A head portion 48 is mounted on the other end of the stem portion 124. The head portion 48 resembles an oversized circular button, and is disposed exteriorly of the housing 100. The user presses the head portion 48 to actuate the switch S1.

The diameter of the housing opening 114 is less than those of the tip portion 126 and the head portion 48 of the actuator so that the actuator 102 will be retained in the housing opening when the push-button switch is assembled.

The housing 100 and actuator 102 may each be formed of a plastic material, which lends itself to fabrication by molding, although other materials may suitably be used.

Figure 10:
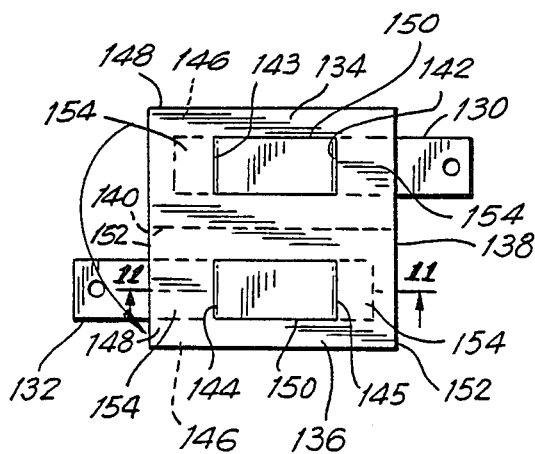
FIG. 10 is a plan view of a contact assembly, partially assembled, used in the push-button switch of the rearview mirror assembly.
Figure 11:
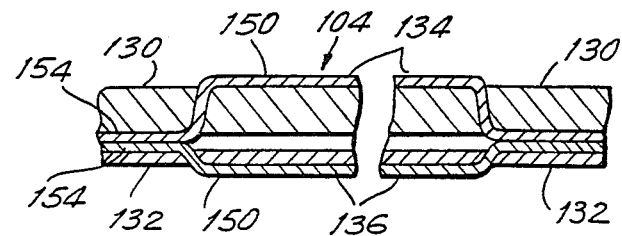
FIG. 11 is an enlarged, detailed side view of the contact assembly used in the push-button switch.

As shown in FIGS. 10 and 11 of the drawings, the contact assembly 104 of the push-button switch basically includes first and second electrically conductive contact members 130, 132, and first and second insulating members 134, 136. The first and second insulating members 134, 136 may be formed from a single sheet of insulating material 138 that is folded in half from one side of the sheet to the other opposite side. Thus, the fold line 140 (shown as a dashed line in FIG. 10) defines the juncture between the first and second insulating members 134, 136. Of course, the first and second insulating members may be separate from each other and formed from their own sheet of insulating material A pair of parallel, spaced apart slots 142-145 are formed through the thickness of each of the first and second insulating members 134, 136. Preferably two slots are provided in each member, although it is envisioned to be within the scope of this invention to have one or more slots formed in each member.

The first and second contact members 130, 132 are inserted through the slots of the first and second insulating members 134, 136, respectively, so that each contact member is disposed in an alternating underlying and overlying relationship with its respective member.

As shown in FIG. 10, the first contact member 130 is inserted through the right hand slot 142 of the first insulating member 134 from the rear side 146 of the insulating member, passes across the front side 148 of the insulating member and is inserted through the left hand slot 143 from the front side 148 of the insulating member 134. Similarly, the second contact member 132 is inserted through the left hand slot 144 of the second insulating member 136 from the rear side 146 of the insulating member, passes across the front side 148 of the insulating member 136, and is inserted through the right hand slot 145 of the insulating member from the front side of the member 136.

The slots 142-145 of each insulating member 134, 136 thus define a central portion 150 between them over which the contact members 130, 132 are exposed on the front side 148 of the insulating member and define with a respective proximate lateral edge 152 of the member a pair of side portions 154 over which the contact members are not exposed on the front side 148 but are exposed on the rear side 146.

Once assembled with the contact members 130, 132 inserted properly in the slots, the sheet of insulating material 138 is folded at the fold line 140 so that the first contact member 130 and first insulating member 134 are disposed in overlying relationship with the second contact member 132 and the second insulating member 136. When disposed in this manner, a portion of the first contact member 130 situated at the central portion 150 of the first insulating member 134 faces a portion of the second contact member 132 situated at the central portion 150 of the second insulating member 136, and a portion of the first insulating member 134 (i.e., the side portions 154 on the first insulating member's front side 148) faces a portion of the second insulating member 136 (i.e., the side portions 154 on the second insulating member's front side 148).

As can be seen from FIG. 11, when the contact assembly 104 is assembled as described above, with the facing portions of the first and second insulating members 134, 136 in contact with one another, the facing portions of the first and second contact members 130, 132 are maintained in a spaced apart relationship a distance equal to the combined thicknesses of the first and second insulating members.

The contact assembly 104 is mounted in the housing 100 with the central portions 150 of the insulating members in axial alignment with the actuator 102. When a force is exerted on the head portion 48 of the actuator, the tip portion 126 will engage the second insulating member 136 at its central portion 150 and force the facing portion of the second contact member 132 to engage the facing portion of the first contact member 130, thus completing an electrical path through the switch. When pressure on the actuator 102 is released, the second contact member 132 will return to its normal disposition out of engagement with the first contact member 130.

In a preferred form of the invention, the first contact member 130 is made relatively thicker than the second contact member 132 and is substantially rigid. The second contact member 132 is made from a much thinner material than the first contact member 130 so as to provide the second contact member with some resiliency. For example, the second contact member 132 may be formed from a spring tempered brass having a thickness of about 0.008 inches, and the first contact member 130 may be formed from quarter tempered brass having a thickness of about 0.031 inches. Brass is preferred because of its springiness; however, other electrically conductive materials may be used to form the first and second contact members.

The first and second insulating members 134, 136 are preferably formed from the same sheet of insulating material, such as Mylar (TM). The thickness of each insulating member is preferably 0.005 inches. Thus, when the contact assembly is formed as shown in FIG. 11, with the facing portions of the first and second insulating members 134, 136 in contact with each other, the gap between the first and second contact members 130, 132 is twice the thickness of the insulating members, or 0.010 inches.

Mylar (TM) is chosen in the construction of the insulating members because of its dimensional stability and its heat resistance, and because it does not absorb water and is rather inexpensive. Of course, other materials having electrical insulating properties may be chosen to form the first and second insulating members 134, 136.

The push-button switch of the present invention is assembled by positioning the stem portion 124 of the actuator in a portion of the housing opening 114 formed in one of the half housing members 106, positioning the contact assembly 104 in the portion of the housing slot 116 also formed in one of the half housing members 106, and press fitting the two half housing members 106 together so that the contact assembly 104 and actuator 102 are captured respectively in the housing slot 116 and housing opening 114. Alternatively, the half housing members 106 and actuator 102 may be assembled together, followed by the insertion of the contact assembly 104 into the housing slot 116 from one lateral side of the housing 100. A portion of each contact member 130, 132 preferably extends beyond an edge of its respective insulating member 134, 136 and outwardly from opposite lateral sides 122 of the housing. This facilitates connection of the push-button switch S1 to the rest of the mirror control circuit.

Because the slot 116 extends between the opposite lateral sides 122 of the housing, the portion of each contact member which extends beyond the housing may be bent to define a slight shoulder 160 which engages the housing sides. This prevents the contact assembly 104 from moving laterally within the housing slot 116.

In the preferred form of the push-button switch S1, the actuator 102 is seated in its normal disposition with its tip portion 126 in contact with the second insulating member 136. Therefore, only slight movement of the actuator 102 will displace the second contact member 132 sufficiently to bridge the gap between the contact members so that the two will contact to provide an electrical path to the switch. Thus, in the example given above, actuator movement of only 0.010 inches will actuate the switch. When pressure is released from the head portion 48 of the actuator, the resiliency of the second contact member 132 will cause it to disengage from the first contact member 130 and return to its normal disposition, breaking the electrical path through the switch.

The push-button switch may be operated in its normally downward disposition, as shown in FIG. 1, or in the opposite disposition with the actuator 102 on top. This is because the actuator 102 is of minimal weight and will still return to its normal position due to the resiliency of the second contact member 132.

Although the illustrative embodiments of the present invention have been described herein with reference to the accompanying drawings, it is to be understood that the invention is not limited to those precise embodiments, and that various other changes and modifications may be effective therein by one skilled in the art without departing from the scope of spirit of the invention.

What is claimed is:

1. An automobile variable reflectivity mirror assembly for mounting to an automobile structure and for use with an electrical power supply, the assembly being operable to provide at least a relatively higher reflectivity orientation and a relatively lower reflectivity orientation, comprising:
   (a) a housing;
   (b) a reflective panel associated with said housing for movement between said higher reflectivity and lower reflectivity orientations, said panel providing higher reflectivity in the higher reflectivity orientation, and providing lower reflectivity in the lower reflectivity orientation;
   (c) means for supplying mechanical power comprising an electrical motor mounted with said housing, said motor having a drive element movable in opposite directions in response to oppositely directed currents applied to the motor;
   (d) means for actuation, said means being associated with said housing, for driving engagement with the drive element to move the panel between the higher and lower reflectivity orientations;
   (e) means for selecting panel orientation in the higher or lower reflectivity positions; and
   (f) electrical circuit means in connection with the panel selection means, said circuit means having means comprising a timing circuit having electrical components for directing current through the motor in one of said opposite directions for a selected period of time in response to the selection means being in the state for higher reflectivity, and for directing current through the motor in the other of said opposite directions for a selected time period in response to the selection means being in the lower reflectivity state, the length of the selected period of time for directing current through the motor in each direction being controlled by the electrical components of the timing circuit.

2. The assembly of claim 1 further comprising the circuit means having means for being placed in a state wherein current is not supplied to the motor.

3. The assembly of claim 2 wherein the selection means comprises a switch, the switch having first and second positions.

4. The assembly of claim 3 wherein the circuit means comprises a toggle circuit in electrical connection with the selection means, the toggle circuit comprising gate means.

5. The assembly of claim 4, wherein the toggle circuit further comprises a capacitor in electrical connection with the gate means.

6. The assembly of claim 5, wherein in the toggle circuit the gate means is electrically connected to the capacitor through a resistor.

7. The assembly of claim 3 wherein the circuit means comprises a toggle circuit, the said toggle circuit including a capacitor, a first logic inverting gate and a second logic inverting gate, each gate having a logic state, each of said gates having an input and an output, the output of the first gate being electrically connected to the capacitor and to the input of the second gate, and the input of the first gate being electrically connected to the output of the second gate and selectively connected to the capacitor by operation of the selection means, so that changing the positioning of the switch will change the respective logic states of the first and second gates.

8. The assembly of claim 7 wherein the timing circuit comprises first and second timing circuits in electrical connection with the toggle circuit, with means for the outputs of the first and second gates to provide first and second logic output signals, respectively, which signals are in alternate states, the states changing upon operation of the selection means, the first and second timing circuits being responsive to the first and second output signals of the toggle circuit, respectively.

9. The assembly of claim 2, wherein the circuit means comprises a toggle circuit in electrical connection with the selection means, the toggle circuit having means to provide a logic output which changes logic states in response to operation of the selection means.

10. The assembly of claim 2 wherein the motor is placed in motion in response to current being directed through it, and the electrical circuit means has means for dynamic braking of the motion of the motor drive element when the circuit means is placed in the state of not supplying current to the motor.

11. The assembly of claim 10 wherein the means for braking comprises a pair of resistors with means for being electrically connected to the motor so that when current ceases to be supplied through the circuit means to the motor, the continued motion of the motor creates reversal of the direction of current flow through the motor.

12. The assembly of claim 2, wherein the electric circuit means comprises a first drive circuit and a second drive circuit, each of the first and second drive circuits being electrically connected to the motor, each of the first and second drive circuits comprising semi-conductor switching means electrically connected to the motor and operable to selectively conduct and not conduct current supplied to the motor.

13. The assembly of claim 12 wherein each of the semi-conductor switching means comprises a transistor electrically connected to the motor, the transistor having a base, and further comprising the first and second drive circuits having a resistor electrically connected to the base of each transistor.

14. The assembly of claim 13 further comprising the selection means having a first position and a second position, a first timing circuit electrically connected to the first drive circuit, and a second timing circuit electrically connected to the second drive circuit, the selection means being electrically connected to the first and second timing circuits, each timing circuit having means for giving an output signal of a predetermined time in response to the positioning of the selection means, the first and second timing circuits each having output signals, the first and second drive circuits being responsive to the output signals of the first and second timing circuits, respectively, to supply and not supply current to the motor.

15. The assembly of claim 14 wherein each of the first and second timing circuit comprises a capacitor and a logic gate coupled to each capacitor, each capacitor being capable of having a charge, the logic gate outputting a signal of a time period determined as a function of the charge on the capacitor of that timing circuit.

16. An automobile variable reflectivity mirror assembly for mounting to an automobile structure and for use with an electrical power supply, the assembly being operable to provide at least a relatively higher reflectivity orientation and a relatively lower reflectivity orientation, comprising:
 (a) a housing;
 (b) a reflective panel associated with said housing for movement between said higher reflectivity and lower reflectivity orientations, said panel providing higher reflectivity in the higher reflectivity orientation, and providing lower reflectivity in said lower reflectivity orientation;
 (c) means for supplying mechanical power comprising an electrical motor mounted with said housing, said motor having a drive element movable in opposite directions in response to oppositely directed currents applied to the motor;
 (d) means for actuation, said means being associated with the housing and being drivingly engaged with the drive element to move the panel between the higher and lower reflectivity orientations;
 (e) means for selecting panel orientation in the higher or lower reflectivity positions; and
 (f) electrical circuit means in electrical connection with the panel selection means, the circuit means comprising first and second drive circuit means, each of which is in electrical connection with the motor so that the first drive circuit means can direct current through the motor in one of said opposite directions to move the motor drive element in a first direction and the second drive circuit means directs current through the motor in the other of said opposite directions to move the motor drive element in a second direction, the first and second drive circuit means each comprising a transistor switch means electrically connected to the motor and operable to conduct and not conduct current to the motor;
 (g) the circuit means further comprising a toggle circuit in electrical connection with the selection means, said toggle circuit having means for providing a logic output signal with a logic state, the logic output changing logic states in response to the selection means; and
 (h) the circuit means further comprising first and second timing circuit means, each timing circuit means in electrical connection with the toggle circuit means, the first timing circuit means in electrical connection with the first drive circuit means, and the second timing circuit means in electrical connection with the second drive circuit means, each timing circuit means having means including a capacitor for giving an output of predetermined time in response to operation of the selection means, so that the first drive circuit means is responsive to the output of the first timing circuit to supply current to the motor in one of said opposite directions and to not supply current to the motor, and the second drive circuit means is responsive to the output of the second timing circuit means to supply current to the motor in the other of said opposite directions and to not supply current to the motor.

17. The assembly of claim 16 wherein the motor is placed in motion in response to current being directed through it, and further comprising the selection means comprising a momentary contact switch; the circuit means comprising an indicator means electrically connected to the toggle circuit for indicating the logic state of the output signal of the toggle circuit; the circuit means further comprising a power control means including a zener diode and a resistor in electrical connection with the first and second drive circuit means and with the first and second timing circuit means; the circuit means having means for being placed in a state wherein current is not supplied to the motor, and means for dynamic braking of the motion of the motor drive element when the circuit means is placed in the state of not supplying current to the motor, comprising first and second resistors, each resistor being electrically connected to the motor and electrically connected to the first and second transistors of the first and second drive circuit means, respectively.

18. An automobile variable reflectivity mirror assembly for mounting to an automobile structure and for use with an electric power supply, the assembly being operable to provide at least a reflectivity higher reflectivity orientation and a relatively lower reflectivity orientation, comprising:
 (a) a housing;
 (b) a reflective panel associated with said support member for movement between said higher reflectivity and lower reflectivity orientations, said panel having a first surface which provides higher reflectivity in the higher reflectivity orientation, and a second surface which provides lower reflectivity in said lower reflectivity orientation;

(c) means for supplying mechanical power comprising an electrical motor mounted with said housing, the motor having a drive element movable in opposite directions in response to oppositely directed current applied to the motor;

(d) means for actuation, said means being associated with the housing and being drivingly engaged with the drive element to move the panel between the higher and lower reflectivity orientations;

(e) means for selecting panel orientation in the higher or lower reflectivity positions;

(f) electrical circuit means in electrical connection with the panel selection means, the circuit means comprising first and second drive circuit means, each of which is in electrical connection with the motor so that the first drive circuit means can direct current through the motor in one of said opposite directions and the second drive circuit can direct current through the motor in the other of said opposite directions, the first and second drive circuit means each comprising first and second switching means comprising first and second transistors electrically connected to the motor and operable to conduct and not conduct current to the motor, each transistor having a base, and first and second resistors electrically connected to the base of the first and second transistors, respectively;

(g) the circuit means further comprising a toggle circuit in electrical connection with the selection means, said toggle circuit having means for operation comprising a capacitor, a first logic inverting gate and a second logic inverting gate, each of said gates having a logic state and having an input and an output, the output of the first gate being electrically connected to the capacitor and to the output of the second gate, the input of the first gate being electrically connected to the output of the second gate and selectively connected to the capacitor by operation of the selection means, so that operation of the selection means changes the respective logic states of the first and second gates; and (h) the circuit means further comprising first and second timing circuit means, each timing circuit means in electrical connection with the toggle circuit means, the first timing circuit means in electrical connection with the first drive circuit means, and the second timing circuit means in electrical connection with the second drive circuit means, each timing circuit means having means including a capacitor, a resistor and gate means for giving an output of predetermined time in response to operation of the selection means, so that the first drive circuit means is responsive to the output of the first timing circuit to supply current to the motor in one of said opposite directions and to not supply current to the motor, and the second drive circuit means is responsive to the output of the second timing circuit means to supply current to the motor in the other of said opposite directions and to not supply current to the motor.

19. An automobile reflectivity mirror assembly for mounting to an automobile structure and for use with an electrical power supply, the assembly being operable to provide at least a relatively higher reflectivity orientation and a relatively lower reflectivity orientation, comprising:

(a) a housing;

(b) a reflective panel associated with said housing for movement between said higher reflectivity and lower reflectivity orientations, said panel providing higher reflectivity in the higher reflectivity orientation, and providing lower reflectivity in said lower reflectivity orientation;

(c) a drive shaft having means for being rotatably mounted in association with the housing, a drive rod, means for drivingly connecting the drive rod with the drive shaft so that rotation of the drive shaft in a first direction moves said drive rod in a first axial direction relative to the shaft, and so that rotation of the drive shaft in a second direction opposite the first direction moves the drive rod in a second axial direction relative to the drive shaft that is opposite the first axial direction of movement;

(d) a transfer mechanism, means for engaging the transfer mechanism with the drive rod and means for engaging the transfer mechanism with the reflective panel, so that the reflective panel is moved in a first direction when the drive rod is moved in the first axial direction, and so that the reflective panel is moved in a second direction when the drive rod moves in the said second axial direction, so that the reflective panel can be moved to said higher and lower reflectivity positions; and (e) electrical circuit means and mechanical power means associated with said drive shaft for rotating the said shaft in the first direction for a preselected time period, and for rotating the shaft in the second direction for a preselected period of time.

20. The automobile mirror assembly of claim 19 wherein the means for drivingly connecting the drive rod with the drive shaft comprises the drive shaft having an axial worm drive gear, the drive shaft having an axis, a drive nut threadingly engaged with said drive shaft for movement along the axis of the shaft, the drive nut having means for being connected with the drive rod so that movement of the drive nut along the axis of the drive shaft in one direction moves the nut to interact with the drive rod to move the rod in the first said axial direction, and so that movement of the nut along the axis of the drive shaft in a second opposite direction moves the nut to interact with the drive rod to move the rod in the second opposite axial direction.

21. The automobile mirror assembly of claim 20 further comprising means for resisting locking of the drive nut relative to the drive rod, comprising a resilient member on each of the sides of the drive nut.

22. The automobile mirror assembly of claim 21 wherein the means for resisting comprises a pair of springs located on opposite sides of the nut and extending about the drive shaft.

23. The automobile mirror assembly of claim 20 wherein the drive rod has an axially oriented passageway having a proximal end and a distal end, the passageway having means for receiving the drive nut and for permitting sliding axial movement of the drive nut therethrough in response to rotation of the worm gear.

24. The automobile mirror assembly of claim 23 further comprising a first wall toward the distal end of the passageway and on one side of the nut, against which force from the nut can be directed, and a second wall on the other side of the nut and being proximal to the first wall and facing opposite the first wall, against which force from the nut can be directed in the opposite direction.

25. The automobile mirror assembly of claim 24 further comprising the drive rod having a second passageway axially aligned with the first passageway of the drive rod and located distally of the first passageway, the second passageway sized to allow axial movement of the drive shaft therethrough but sized to resist movement of the nut into the second passageway.

26. The automobile mirror assembly of claim 19 wherein the drive rod has means for providing camming action, and wherein the transfer mechanism has means for engagement with the camming means so that movement of the drive rod in the first direction causes camming action to move the reflective panel in the said first direction, and so that movement of the drive rod in the said second direction causes camming action to move the reflective panel in the second direction.

27. The automobile mirror assembly of claim 24, the drive shaft having a surface, wherein the means for camming is a recess in the surface of the drive shaft, and wherein the transfer mechanism has a projecting member for being received by the drive rod recess so that movement of the projecting member along the recess as the drive rod moves causes movement of the reflective panel.

28. The automobile mirror assembly of claim 27 wherein the recess is oriented generally diagonally relative to the axis of the drive rod.

29. An automobile variable reflectivity mirror assembly for mounting to an automobile structure and for use with an electrical power supply, the assembly being operable to provide at least a relatively higher reflectivity orientation and a relatively lower reflectivity orientation, comprising:

(a) a housing;
(b) a reflective panel associated with said housing for movement between said higher reflectivity and lower reflectivity orientations, said panel providing higher reflectivity in the higher reflectivity orientation, and providing lower reflectivity in said lower reflectivity orientation;
(c) a motor mounted to the housing, the motor having a drive shaft which drives a worm gear;
(d) a nut threadingly mounted to the shaft for axial movement along the shaft;
(e) a drive rod, the drive rod having a first axial passageway having proximal and distal ends and sized to slidingly receive the nut, and a second axial passageway distal to and aligned with the first passageway to receive the drive shaft for movement therethrough but sized to prevent entry of the drive nut therein, a first wall at the distal end of the first passageway and located to one side of the nut, against which force from the nut can be transmitted to move the drive rod in a first axial direction; and a second wall associated with the first passageway and being located on a side opposite from the said one side of the nut from the first wall and proximally of the first wall, against which force can be applied from the nut to move the drive rod in a second axial direction; and
(f) the rod having means for camming connection of the rod to the reflective panel so that movement of the rod in the first axial direction causes movement of the panel toward the higher reflectivity orientation, and movement of the drive rod in the second axial direction causes movement of the panel toward the lower reflectivity orientation.

30. The automobile mirror assembly of claim 29 wherein the means for camming comprises an interconnecting member associated with the housing and being part of an interconnection between the reflective panel and the drive rod, and further comprising a slot in one of the interconnecting member or the drive rod, and a projecting member rod and fitting within the slot, so that movement of the projecting member along the slot in a first direction causes movement of the reflective panel toward the higher reflectivity orientation, and movement of the projecting member along the slot in a second direction causes movement of the reflective panel toward the lower reflectivity orientation.

31. The automobile reflective mirror assembly of claim 30, the drive rod having a surface, and wherein the slot extends generally diagonally to the drive rod in the surface of the drive rod, and the projecting member extends from the interconnecting member.

32. The automobile mirror assembly of claim 20 further comprising means for resisting locking of the nut against sliding movement within the first passageway, comprising a resilient member mounted between the nut and the first wall, and a resilient member located between the nut and the second wall.

33. The automobile mirror assembly of claim 32 wherein the resilient members are helical springs which wind about the drive shaft.

34. An automobile variable reflectivity mirror assembly for mounting to an automobile structure and for use with an electrical power supply, the assembly being operable to provide at least a relatively higher reflectivity orientation and a relatively lower reflectivity orientation, comprising:

(a) a housing;
(b) a reflective panel pivotally mounted relative to the housing, the panel having a first surface which provides higher reflectivity in a first orientation, and a second surface which provides a lower reflectivity in another orientation;
(c) a motor mounted to the housing, the motor having a drive shaft drivingly connected to a worm gear;
(d) a non-circular nut threadingly mounted to the shaft for axial movement along the shaft;
(e) a drive rod having a distal end and a proximal end, the rod having a first proximal axial passageway and a second passageway distal to the first passageway and axially aligned with the first passageway, the first passageway having a shape corresponding to the shape of the nut to permit the nut to be slidingly received within the first passageway, the second passageway sized to receive the drive shaft for movement therethrough but sized to prevent entry of the nut therein, the first passageway having a distal wall to one side of the nut against which force from the nut can be transmitted to move the drive rod in a first direction; a second wall connected with the drive rod and located on the opposite side of the nut from the first wall and against which force from the nut can be transmitted to move the drive rod in a second axial direction;
(f) an interconnecting member for connecting the drive rod with the reflective panel, the interconnecting member having a projecting member;
(g) means for camming interaction between the interconnecting member and the drive rod comprising the drive rod having a slot extending generally diagonally in the surface of the rod and having a pair of walls sized to allow the projecting member to slidingly fit therebetween and move along the slot so that movement of the projecting member along the slot in a first direction pivots the reflective panel toward the higher reflectivity orientation, and movement of the projecting member along the slot in a second direction pivots the reflective panel in an opposite direction toward the lower reflectivity orientation; and (h) means for resisting the locking of the nut within the first passageway so that it cannot slidingly move therein, comprising first and second resilient means located within the first passageway on each side of the nut.

35. An automobile variable reflectivity mirror assembly for mounting to an automobile structure and for use with an electrical power supply, the assembly being operable to provide at least a relatively higher reflectivity orientation and a relatively lower reflectivity orientation, comprising:

(a) a housing;
(b) a reflective panel associated with said housing for movement between said higher reflectivity and lower reflectivity orientations, said panel providing higher reflectivity in the higher reflectivity orientation, and providing lower reflectivity in the lower reflectivity orientation;
(c) means for supplying mechanical power comprising an electrical motor mounted with said housing, said motor having a drive element movable in opposite directions in response to oppositely directed currents applied to the motor;
(d) means for actuation, said means being associated with said housing, for driving engagement with the drive element to move the panel between the higher and lower reflectivity orientations;
(e) means for selecting panel orientation in the higher or lower reflectivity positions;
(f) electrical circuit means in connection with the panel selection means, said circuit means having means for directing current, comprising a timing circuit for directing current through the motor in one of said opposite directions for a selected period of time in response to the selection means being in the state for higher reflectivity, and for directing current through the motor in the other of said opposite directions for a selected time period in response to the selection means being in the lower reflectivity state, and a toggle circuit in electrical connection with the selection means, the toggle circuit having means for providing a logic output with a logic state, the logic output changing states in response to operation of the selection means.

36. An automobile variable reflectivity mirror assembly for mounting to an automobile structure and for use with an electrical power supply, the assembly being operable to provide at least a relatively higher reflectivity orientation and a relatively lower reflectivity orientation, comprising:

(a) a housing;
(b) a reflective panel associated with said housing for movement between said higher reflectivity and lower reflectivity orientations, said panel providing higher reflectivity in the higher reflectivity orientation, and providing lower reflectivity in the lower reflectivity orientation;

(c) means for supplying mechanical power comprising an electrical motor mounted with said housing, said motor having a drive element movable in opposite directions in response to oppositely directed currents applied to the motor;
(d) means for actuation, said means being associated with said housing, for driving engagement with the drive element to move the panel between the higher and lower reflectivity orientations;
(e) means for selecting panel orientations in the higher or lower reflectivity positions;
(f) electrical circuit means in connection with the panel selection means, said circuit means having means for directing current, comprising a timing circuit for directing current through the motor in one of said opposite directions for a selected period of time in response to the selection means being in the state for higher reflectivity, and for directing current through the motor in the other of said opposite directions for a selected time period in response to the selection means being in the lower reflectivity state, a first drive circuit and a second drive circuit, each of the first and second drive circuit being electrically connected to the motor, each of the first and second drive circuits comprising semiconductor switching means electrically connected to the motor and operable to selectively conduct and not conduct current supplied to the motor.

37. An electrical circuit for use with an automobile variable reflectivity mirror assembly having a housing for mounting to an automobile structure and for use with an electrical power supply, a reflective mirror panel mounted to move higher reflectivity and lower reflectivity orientations, an electrical motor mounted with the housing, the motor having a drive element movable in opposite directions in response to oppositely directed currents applied to the motor to move the panel, and a means for selecting panel orientation in the higher or lower reflectivity positions, said circuit comprising:

circuit means having means comprising a timing circuit having electrical components for directing current through the motor in one of said opposite directions for a selected period of time in response to the selection means being in the state for higher reflectivity, and for directing current through the motor in the other of said opposite directions for a selected time period in response to the selection means being in the lower reflectivity state, the length of the selected period of time for directing current through the motor in each direction being controlled by the electrical components of the timing circuit.

38. An electrical circuit for use with an automobile variable reflectivity mirror assembly having a housing for mounting to an automobile structure and for use with an electrical power supply, a reflective mirror panel mounted to move to higher reflectivity and lower reflectivity orientations, an electrical motor mounted with the housing, the motor having a drive element movable in opposite directions in response to oppositely directed currents applied to the motor to move the panel, and a means for selecting panel orientation in the higher or lower reflectivity positions, said circuit comprising:

electrical circuit means in connection with the panel selection means, said circuit means having means for directing current, comprising a timing circuit for directing current through the motor in one of said opposite directions for a selected period of time in response to the selection means being in the state for higher reflectivity, and for directing current through the motor in the other of said opposite directions for a selected time period in response to the selection means being in the lower reflectivity state, and a toggle circuit in electrical connection with the selection means, the toggle circuit having means for providing a logic output with a logic state, the logic output changing states in response to operation of the selection means.

39. An electrical circuit for use with an automobile variable reflectivity mirror assembly having a housing for mounting to an automobile structure and for use with an electrical power supply, a reflective mirror panel mounted to move to higher reflectivity and lower reflectivity orientations, an electrical motor mounted with the housing, the motor having a drive element movable in opposite directions in response to oppositely directed currents applied to the motor to move the panel, and a means for selecting panel orientation in the higher or lower reflectivity positions, said circuit comprising:

electrical circuit means in connection with the panel selection means, said circuit means having means for directing current, comprising a timing circuit for directing current through the motor in one of said opposite directions for a selected period of time in response to the selection means being in the state for higher reflectivity, and for directing current through the motor in the other of said opposite directions for a selected time period in response to the selection means being in the lower reflectivity state, a first drive circuit and a second drive circuit, each of the first and second drive circuit being electrically connected to the motor, each of the first and second drive circuits comprising semiconductor switching means electrically connected to the motor and operable to selectively conduct and not conduct current supplied to the motor.

* * * * *